(12) United States Patent
Maeda

(10) Patent No.: US 7,746,014 B2
(45) Date of Patent: Jun. 29, 2010

(54) MOTOR DRIVING APPARATUS, BRUSHLESS MOTOR, AND METHOD FOR DRIVING THE SAME

(75) Inventor: Minoru Maeda, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 309 days.

(21) Appl. No.: 11/853,298

(22) Filed: Sep. 11, 2007

(65) Prior Publication Data

US 2009/0108781 A1 Apr. 30, 2009

(30) Foreign Application Priority Data

Sep. 12, 2006 (JP) .............................. 2006-246852

(51) Int. Cl.
*H02P 6/08* (2006.01)
(52) U.S. Cl. .................... 318/400.09; 318/400.01; 318/599
(58) Field of Classification Search ............ 318/400.01, 318/400.09, 599
See application file for complete search history.

(56) References Cited

U.S. PATENT DOCUMENTS

| | | | | |
|---|---|---|---|---|
| 5,309,078 A | * | 5/1994 | Cameron | .................... 318/811 |
| 6,008,619 A | * | 12/1999 | Murase et al. | ............... 318/811 |
| 6,153,989 A | * | 11/2000 | Kardash et al. | ........ 318/400.09 |
| 6,528,968 B2 | * | 3/2003 | Seima et al. | ................. 318/811 |
| 6,873,125 B2 | * | 3/2005 | Seima et al. | ........... 318/400.09 |
| 2002/0158600 A1 | | 10/2002 | Seima et al. | |

FOREIGN PATENT DOCUMENTS

JP 2002-272162 A 9/2002

* cited by examiner

*Primary Examiner*—Bentsu Ro
*Assistant Examiner*—David S Luo
(74) *Attorney, Agent, or Firm*—Foley & Lardner LLP (57) ABSTRACT

A motor driving apparatus has first, second, and third positive-side driving transistors having drains which are supplied with a power supply voltage, first, second, and third negative-side driving transistors having sources which are grounded and drains which are connected to sources of the first, second, and third positive-side driving transistors, respectively, a power supply monitoring circuit which monitors the power supply voltage and outputs a driving mode switching signal which has a first value if the power supply voltage is not less than a predetermined value and has a second value if the power supply voltage is less than the predetermined value, and an output PWM control section which switches a mode of driving from synchronous rectification PWM driving to one-way PWM driving on the basis of a change of the driving mode switching signal from the second value to the first value.

17 Claims, 8 Drawing Sheets

MOTOR DRIVING APPARATUS, BRUSHLESS MOTOR, AND METHOD FOR DRIVING THE SAME

CROSS REFERENCE TO RELATED APPLICATION

This application is based upon and claims benefit of priority under 35 USC 119 from the Japanese Patent Application No. 2006-246852, filed on Sep. 12, 2006, the entire contents of which are incorporated herein by reference.

BACKGROUND OF THE INVENTION

1. Field of the Invention

The present invention relates to a motor driving apparatus, a brushless motor, and a method for driving the brushless motor.

2. Related Art

In a brushless motor widely used in electrical apparatuses as a motor, the position of a rotor which includes a permanent magnet is detected by a plurality of position detectors (e.g., Hall elements) which are arranged at regular intervals near the rotational orbit of the rotor, and the rotor is rotatively driven by switching the energization statuses of a plurality of driving coil windings in synchronism with changes in detected signals between the on and off states. For example, a three-phase brushless motor is generally configured to include three coil windings and generate a rotational torque by repeating switching of the energization statuses of two of the three coil windings.

As a motor driving apparatus which switches the energization statuses (voltage application statuses) of three driving coils of a three-phase brushless motor, there is proposed one including a power supply, a switching circuit which is provided between power supply lines and connected to driving coils, a PWM control section which switches the mode of driving between synchronous rectification PWM driving and one-way PWM driving using a decelerating signal for speed control, a pulse width modulating section, a position detecting section, and an energization switching section (see, e.g., Japanese Patent Laid-Open No. 2002-272162).

In the switching circuit, series circuits of an upper transistor and a lower transistor are provided as switching elements corresponding to three phases. A diode for protection against counter electromotive force is connected in parallel with each transistor. One ends of three driving coils are respectively connected to connection points between the upper transistors and the lower transistors, and the other ends are commonly connected. Drains of the three upper transistors are commonly connected, and sources of the three lower transistors are commonly connected.

The position detecting section detects the positional relationship between a rotor magnet and the driving coils. The energization switching section outputs an energization switching signal to the driving coils on the basis of an output from the position detecting section. The pulse width modulating section outputs a frequency signal with a pulse width corresponding to a torque command signal for controlling a torque generated by a brushless motor. The PWM control section performs on/off control of the transistors of the switching circuit on the basis of an energization switching signal and a signal output from the pulse width modulating section.

The operation of the aforementioned motor driving apparatus will be described. The three driving coils will be referred to as driving coils A, B, and C. The upper transistor, to which one end of the driving coil A is connected, will be referred to as a transistor TAu while the lower transistor, to which the one end of the driving coil A is connected, will be referred to as a transistor TAd. Similarly, the upper and lower transistors, to which one end of the driving coil B is connected, will be referred to as transistors TBu and TBd, respectively, while the upper and lower transistors, to which one end of the driving coil C is connected, will be referred to as transistors TCu and TCd, respectively.

When the driving coils A and B are energized, the transistor TAu is turned on, the transistor TAd is turned off, and the transistors TBu and TBd perform on-off operation in synchronous rectification PWM driving, except during a torque command-based decelerating period such as when in a steady state. PWM stands for Pulse Width Modulation and is a method for controlling power by changing the duty ratio (the ratio of the on time) of pulses for driving a motor. To cause both the upper and lower transistors to perform PWM operation is referred to as synchronous rectification PWM driving. When the transistor TBu is on, the transistor TBd is off. On the other hand, when the transistor TBu is off, the transistor TBd is on.

During a torque command-based decelerating period, turning on or off of the transistor TBd does not cause the transistor TBu to be turned on or off. Accordingly, when the transistor TBd is off, a regenerative current flows through the diode connected in parallel with the transistor TBu. This is referred to as one-way PWM driving. In the case of synchronous rectification PWM driving, during a decelerating period, the pulse width (duty ratio) for PWM driving decreases. A current flowing backward from the driving coils to a power supply may increase a power supply voltage and cause device breakdown. Switching of the mode of driving to one-way PWM driving in accordance with a decelerating signal for speed control makes the driving efficiency lower than that in synchronous rectification PWM driving but makes it possible to prevent device breakdown.

As described above, except during a torque command-based decelerating period such as when in a steady state, the motor driving apparatus prevents a current from flowing through the diodes for protection against counter electromotive force and can implement low-loss driving. During a decelerating period, the motor driving apparatus prevents a current from flowing backward to the power supply and prevents device breakdown.

A rise in power supply voltage caused by a current flowing backward to a power supply varies depending on the impedance of the power supply. A rise in voltage decreases with a decrease in power supply impedance. If another circuit is connected to the power supply, and the power supply impedance apparently becomes low, a rise in voltage becomes small. A rise in voltage also becomes small depending on a decrease in the speed or the number of revolutions of a motor and may not lead to device breakdown. However, the aforementioned motor driving apparatus switches between synchronous rectification PWM driving and one-way PWM driving using a decelerating signal for speed control. Accordingly, whenever a deceleration command is issued, the motor driving apparatus switches to one-way PWM driving even if a rise in voltage stops short of leading to device breakdown, and the driving efficiency decreases.

SUMMARY OF THE INVENTION

According to one aspect of the present invention, there is provided a motor driving apparatus comprising:

a position detecting circuit which detects a positional relationship between a rotor magnet of a brushless motor and driving coils;

an energization signal generating circuit which outputs an energization switching timing signal for the driving coils on the basis of a result of the detection by the position detecting circuit;

a speed deviation detecting circuit which detects whether a rotational speed of the brushless motor falls within a speed region based on a target rotational speed obtained from a speed command signal and outputs a certain rotation detecting signal as a result of the detection and speed difference information indicating a difference between the rotational speed of the brushless motor and the target rotational speed based on the speed command signal;

a rotational speed controlling circuit which outputs a speed controlling signal serving as an acceleration command or a deceleration command on the basis of the speed difference information;

first, second, and third positive-side driving transistors having drains which are supplied with a power supply voltage and are commonly connected;

first, second, and third negative-side driving transistors having sources which are grounded via a resistor and are commonly connected and drains which are connected to sources of the first, second, and third positive-side driving transistors, respectively;

a power supply monitoring circuit which monitors the power supply voltage and outputs a driving mode switching signal which has a first value if the power supply voltage is not less than a predetermined value and has a second value if the power supply voltage is less than the predetermined value; and an output PWM control section to which the energization switching timing signal, certain rotation detecting signal, speed controlling signal, and driving mode switching signal are input and which is connected to gates of the positive-side driving transistors and negative-side driving transistors to perform on/off control and switches a mode of driving from synchronous rectification PWM driving to one-way PWM driving on the basis of a change of the driving mode switching signal from the second value to the first value.

According to one aspect of the present invention, there is provided a brushless motor comprising:

a rotor magnet;

first, second, and third driving coils which are provided to oppose the rotor magnet and have one ends commonly connected;

a position detecting circuit which detects a positional relationship between the rotor magnet and the first, second, and third driving coils;

an energization signal generating circuit which outputs an energization switching timing signal for the driving coils on the basis of a result of the detection by the position detecting circuit;

a speed deviation detecting circuit which detects whether a rotational speed of the rotor magnet falls within a speed region based on a target rotational speed obtained from a speed command signal and outputs a certain rotation detecting signal as a result of the detection and speed difference information indicating a difference between the rotational speed of the rotor magnet and the target rotational speed based on the speed command signal;

a rotational speed controlling circuit which outputs a speed controlling signal serving as an acceleration command or a deceleration command on the basis of the speed difference information;

first, second, and third positive-side driving transistors having drains which are supplied with a power supply voltage and are commonly connected;

first, second, and third negative-side driving transistors having sources which are grounded via a resistor and are commonly connected and drains which are respectively connected to sources of the first, second, and third positive-side driving transistors and the other ends of the first, second, and third driving coils;

a power supply monitoring circuit which monitors the power supply voltage and outputs a driving mode switching signal which has a first value if the power supply voltage is not less than a predetermined value and has a second value if the power supply voltage is less than the predetermined value; and an output PWM control section to which the energization switching timing signal, certain rotation detecting signal, speed controlling signal, and driving mode switching signal are input and which performs on/off control of the positive-side driving transistors and negative-side driving transistors and switches a mode of driving from synchronous rectification PWM driving to one-way PWM driving on the basis of a change of the driving mode switching signal from the second value to the first value.

According to one aspect of the present invention, there is provided a method for driving a brushless motor using a motor driving apparatus having a position detecting circuit, an energization signal generating circuit, a speed deviation detecting circuit, a rotational speed controlling circuit, three positive-side driving transistors, three negative-side driving transistors, a power supply monitoring circuit, and an output PWM control section, wherein the position detecting circuit detects a positional relationship between a rotor magnet of the brushless motor and driving coils, the energization signal generating circuit outputs an energization switching timing signal for the driving coils on the basis of a result of the detection by the position detecting circuit, the speed deviation detecting circuit detects whether a rotational speed of the brushless motor falls within a speed region based on a target rotational speed obtained from a speed command signal and outputs a certain rotation detecting signal as a result of the detection and speed difference information indicating a difference between the rotational speed of the brushless motor and the target rotational speed based on the speed command signal, the rotational speed controlling circuit outputs a speed controlling signal serving as an acceleration command or a deceleration command on the basis of the speed difference information, the positive-side driving transistors and the negative-side driving transistors switch application of a power supply voltage to the driving coils, the power supply monitoring circuit monitors the power supply voltage and outputs a driving mode switching signal which has a first value if the power supply voltage is not less than a predetermined value and has a second value if the power supply voltage is less than the predetermined value, and the output PWM control section performs on/off control of the positive-side driving transistors and negative-side driving transistors on the basis of the energization switching timing signal, certain rotation detecting signal, speed controlling signal, and driving mode switching signal and switches a mode of driving from synchronous rectification PWM driving to one-way PWM driving on the basis of a change of the driving mode switching signal from the second value to the first value.

DESCRIPTION OF THE EMBODIMENTS

A motor driving apparatus, a brushless motor, and a method for driving the brushless motor according to an embodiment of the present invention will be described below with reference to the drawings.

Figure 1:
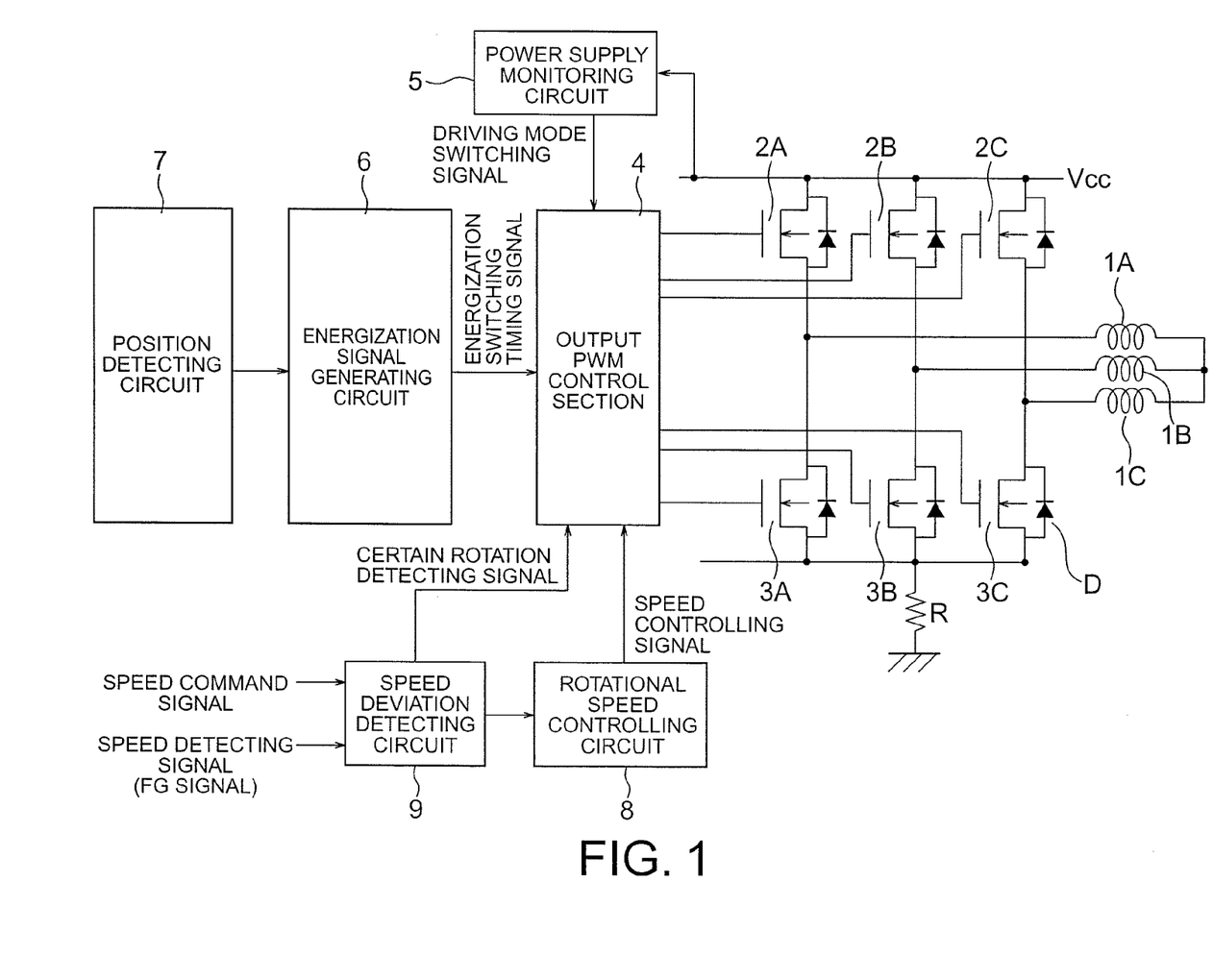
FIG. 1 is a diagram showing the schematic configuration of a motor driving apparatus according to an embodiment of the present invention.
Figure 2:
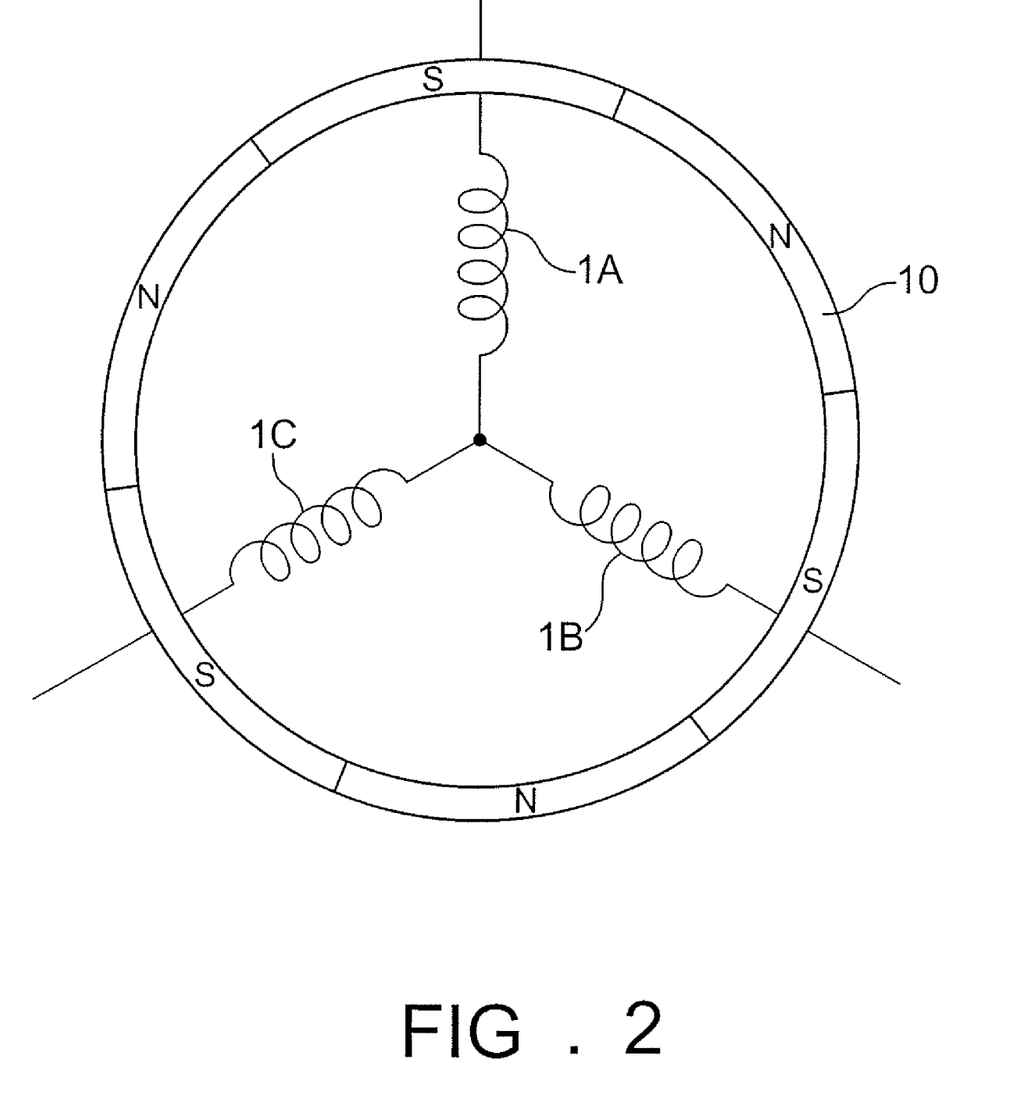
FIG. 2 is a view showing the schematic configuration of driving coils and a rotor magnet according to the embodiment.

FIG. 1 shows the schematic configuration of the motor driving apparatus according to the embodiment of the present invention. Driving coils 1A, 1B, and 1C are provided to oppose a rotor magnet 10 (see FIG. 2) and have respective one terminals commonly connected on one side thereof. Driving transistors 2A, 2B, and 2C serving as positive-side switching elements and driving transistors 3A, 3B, and 3C serving as negative-side switching elements are respectively connected in series. Drains of the driving transistors 2A, 2B, and 2C are commonly connected and are supplied with a power supply voltage Vcc. Sources of the driving transistors 3A, 3B, and 3C are commonly connected and are grounded via a resistor R. A source of the driving transistor 2A, a drain of the driving transistor 3A, and the other terminal of the driving coil 1A are commonly connected. A source of the driving transistor 2B, a drain of the driving transistor 3B, and the other terminal of the driving coil 1B are commonly connected. A source of the driving transistor 2C, a drain of the driving transistor 3C, and the other terminal of the driving coil 1C are commonly connected. A diode D which is a parasitic diode is formed between the source and drain of each driving transistor. The rotor of the motor is rotated by feeding a motor driving current to the driving coils 1A, 1B, and 1C using the driving transistors 2A, 2B, 2C, 3A, 3B, and 3C and switching the energization statuses (voltage application statuses) of the driving coils 1A, 1B, and 1C.

A position detecting circuit 7 detects the positional relationship between the rotor magnet and the driving coils 1A, 1B, and 1C and outputs the detection result to an energization signal generating circuit 6.

The energization signal generating circuit 6 outputs an energization switching timing signal for switching the energization statuses of the driving coils 1A, 1B, and 1C on the basis of the detection result.

A speed command signal and a speed detecting signal (FG signal) are input to a speed deviation detecting circuit 9, which detects whether the rotational speed of the motor (the rotational speed of the rotor magnet) is within a target speed region. The speed deviation detecting circuit 9 calculates the difference between a target speed obtained from the speed command signal and the motor rotational speed detected from the FG signal, using a pulse signal whose frequency is a predetermined number of times (e.g., 1,024 times) that of a reference clock. If the difference in the number of pulses corresponding to the difference in speed is within, e.g., ±6% of the target speed, the speed deviation detecting circuit 9 determines that the motor rotational speed is within the target speed region. The speed deviation detecting circuit 9 outputs the result of detecting whether the motor rotational speed is within the target speed region, as a certain rotation detecting signal. The speed deviation detecting circuit 9 outputs the difference in the number of pulses as speed difference information to a rotational speed controlling circuit 8.

The rotational speed controlling circuit 8 converts the input difference in the number of pulses (speed difference information) into an analog signal and outputs the analog signal as a speed controlling signal. The speed controlling signal serves as an acceleration command if the motor rotational speed is lower than the target speed and serves as a deceleration command if the motor rotational speed is higher than the target speed.

Figure 3:
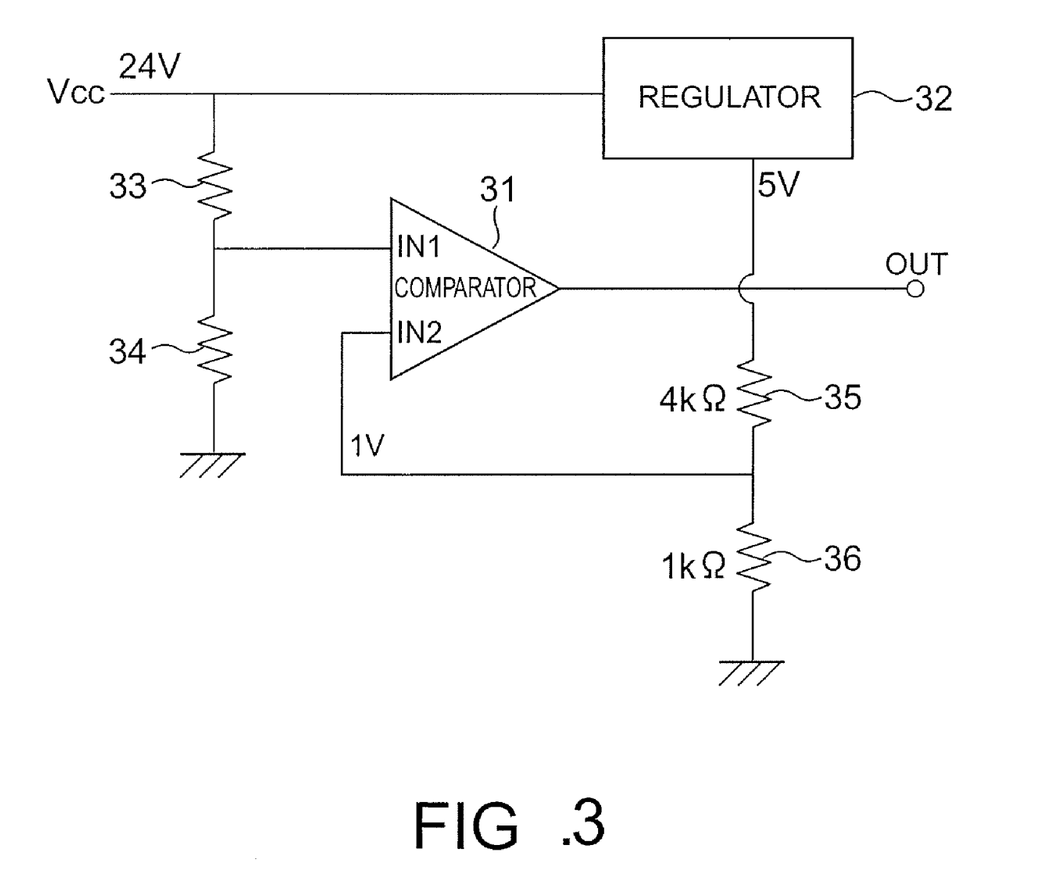
FIG. 3 is a diagram showing an example of the configuration of a power supply monitoring circuit in the motor driving apparatus according to the embodiment.

A power supply monitoring circuit 5 monitors the power supply voltage Vcc and outputs a driving mode switching signal on the basis of the power supply voltage Vcc. FIG. 3 shows an example of the configuration of the power supply monitoring circuit 5. The power supply monitoring circuit 5 has a comparator 31, a regulator 32, and resistors 33 to 36. The comparator 31 has input terminals IN1 and IN2. If the voltage of a signal input to the input terminal IN1 is higher than that of a signal input to the input terminal IN2, the level of the output from an output terminal OUT becomes high. Otherwise, the level of the output from the output terminal OUT becomes low.

A voltage resultant from division of the power supply voltage Vcc by the resistors 33 and 34 is input to the input terminal IN1. A voltage resultant from division of a voltage output from the regulator 32 by the resistors 35 and 36 is input to the input terminal IN2.

For example, assume that the power supply voltage Vcc at normal times is 24 V and the output from the regulator is 5 V. By setting the resistance of the resistor 35 to 4 kΩ and that of the resistor 36 to 1 kΩ, 1 V is input to the input terminal IN2 of the comparator 31. It is possible to detect from an output value whether the power supply voltage Vcc has reached a set voltage (>24 V) by adjusting the resistances of the resistors 33 and 34 such that the voltage of a signal input to the input terminal IN1 exceeds 1 V when the power supply voltage Vcc exceeds the set voltage. An output from the output terminal OUT serves as the driving mode switching signal.

The energization switching timing signal, certain rotation detecting signal, speed controlling signal, and driving mode switching signal are input to an output PWM control section 4, which performs on/off control of the driving transistors 2A, 2B, 2C, 3A, 3B, and 3C on the basis of these signals. Along with a change of the driving mode switching signal from the low level to the high level, the output PWM control section 4 changes the mode of driving from synchronous rectification PWM driving to one-way PWM driving. The output PWM control section 4 increases the pulse width (duty ratio) for PWM driving if an acceleration command is input as the speed controlling signal and decreases the pulse width if a deceleration command is input as the speed controlling signal.

Figure 4:
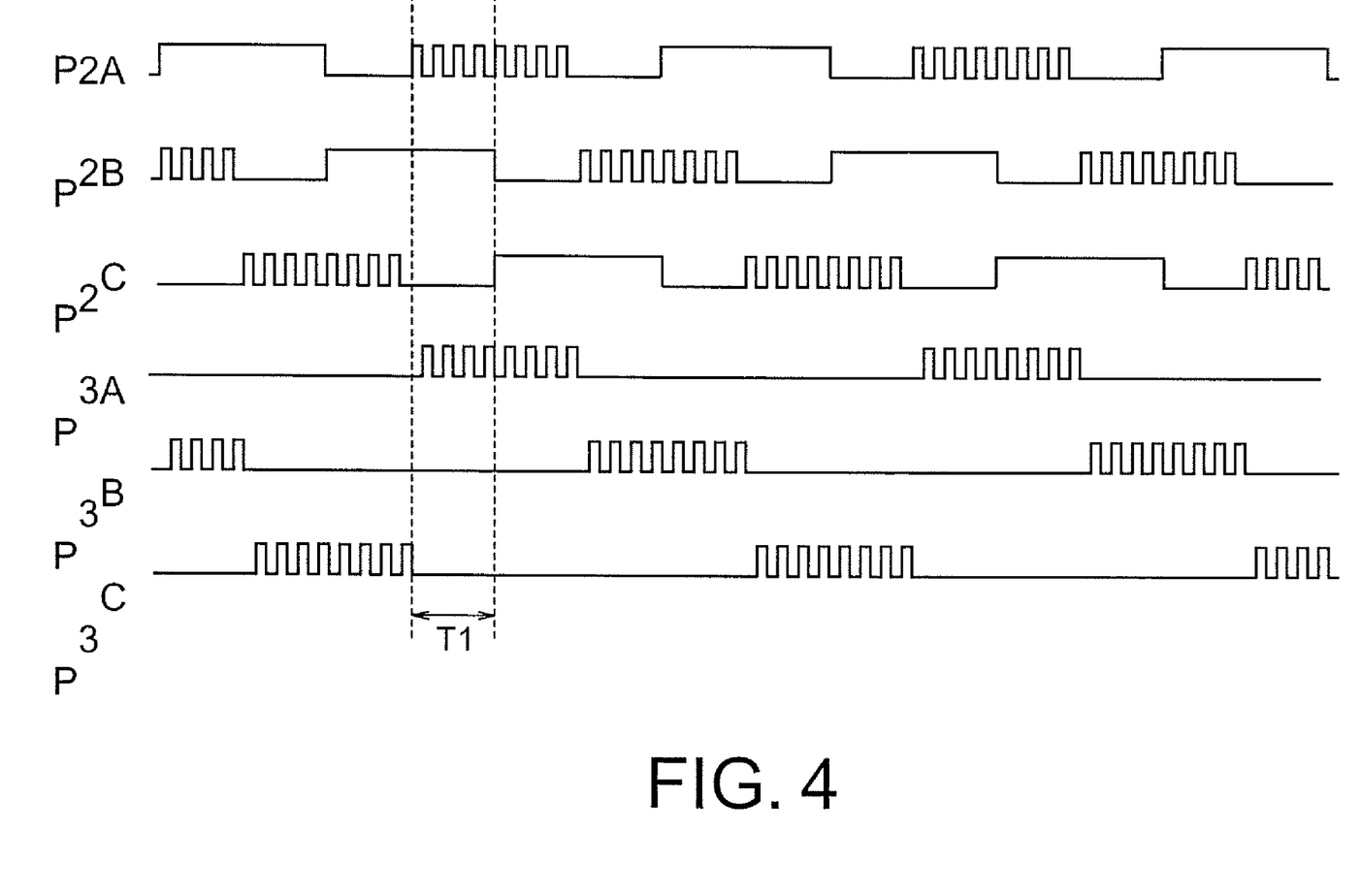
FIG. 4 is a timing chart showing the timing of energization for each driving transistor in the motor driving apparatus according to the embodiment.
Figure 6:
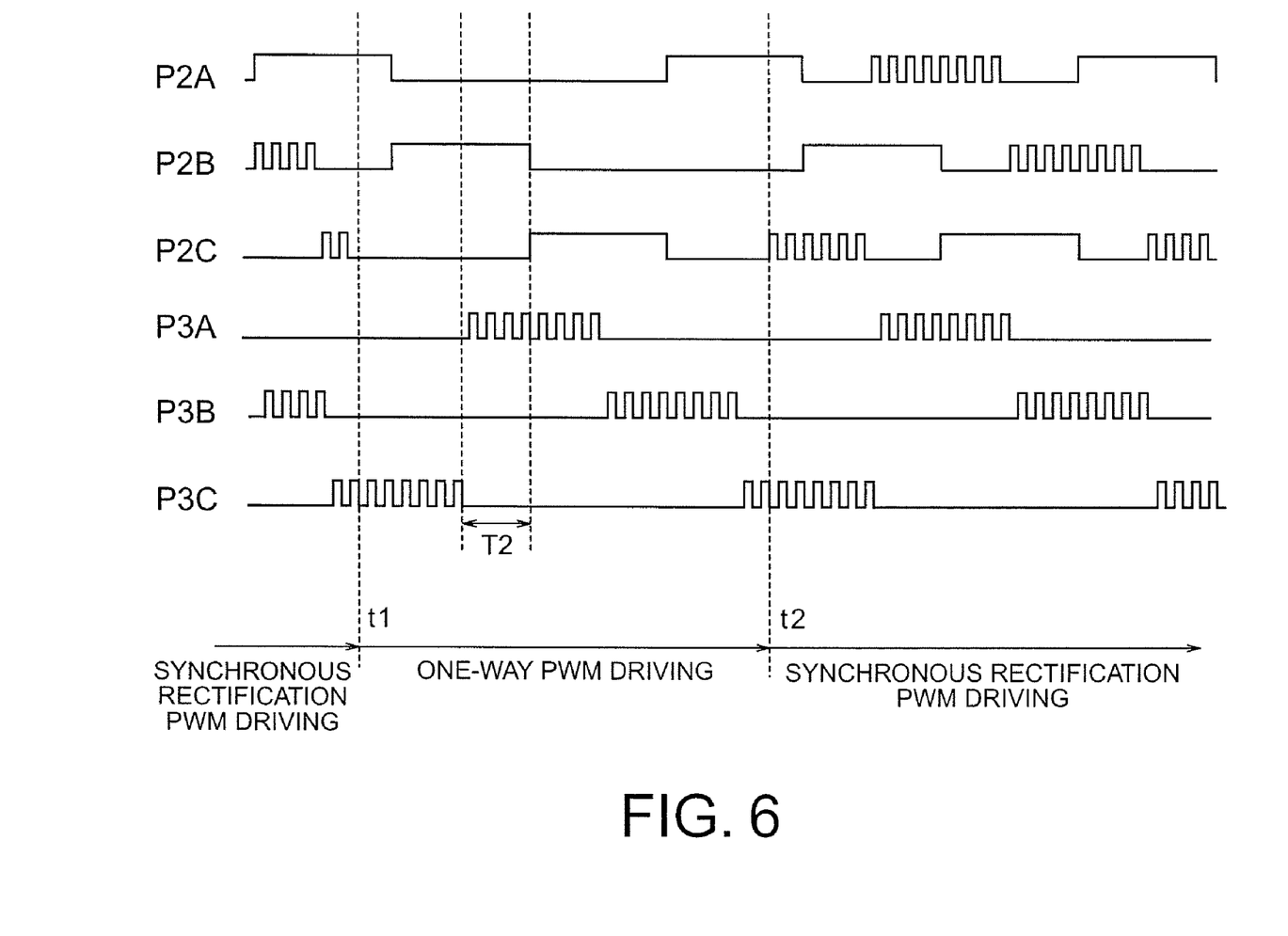
FIG. 6 is a timing chart showing the timing of energization for each driving transistor in the motor driving apparatus according to the embodiment.

The operation of the motor driving apparatus according to this embodiment will be described. On/off control signals which are output from the output PWM control section 4 and are input to gate electrodes of the driving transistors 2A, 2B, 2C, 3A, 3B, and 3C will be referred to as signals P2A, P2B, P2C, P3A, P3B, and P3C, respectively. FIGS. 4 and 6 each show the timing for the on/off control signals.

FIG. 4 shows the timing for the on/off control signals when the mode of driving remains synchronous rectification PWM driving. That is, the period covered in FIG. 4 includes only a period which is not a motor rotational speed decreasing period or a period which is a motor rotational speed decreasing period and when the power supply voltage raised by a backward current from the driving coils to the power supply is lower than the set value. When the driving transistor 2A is off in PWM operation, the driving transistor 3A is on. On the other hand, when the driving transistor 2A is on, the driving transistor 3A is off. The same applies to the driving transistors 2B and 3B and the driving transistors 2C and 3C.

Figure 5A:
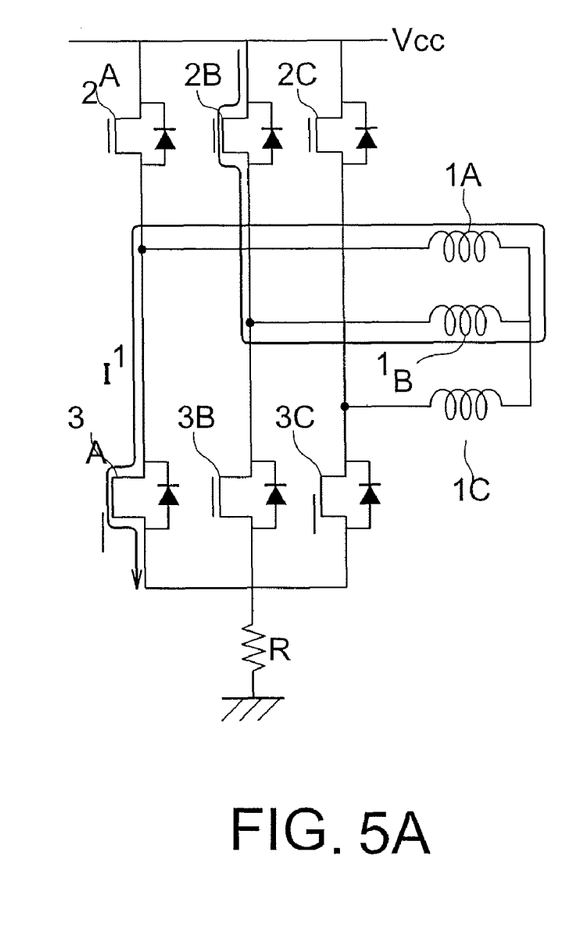
FIG. 5A is a diagram showing the flow of a regenerative current in the motor driving apparatus according to the embodiment.
Figure 5B:
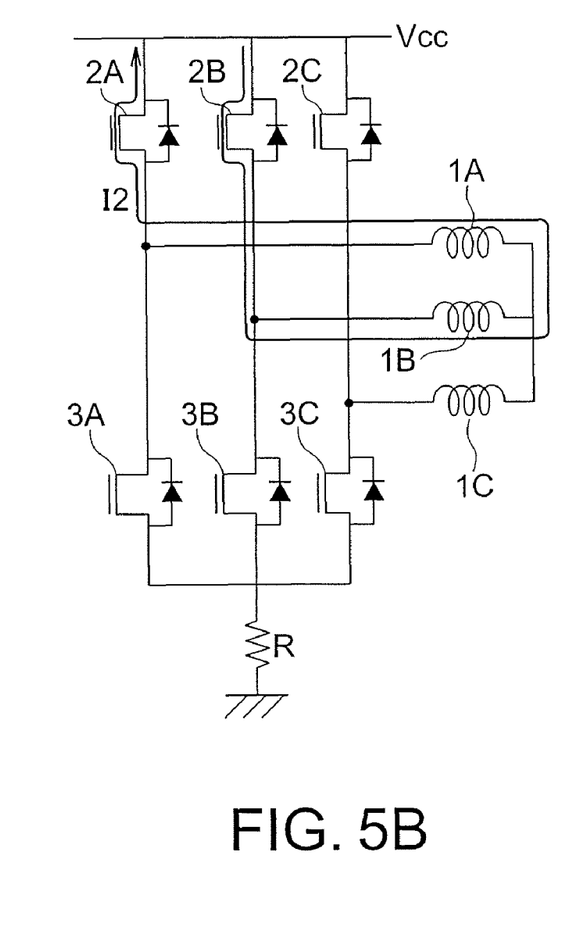
FIG. 5B is a diagram showing the flow of a regenerative current in the motor driving apparatus according to the embodiment.

For example, during a period T1 in FIG. 4, a current flows through the driving coil 1B and driving coil 1A in this order from the power supply. During the period T1, the driving transistor 2B remains on while the driving transistors 3B, 2C, and 3C remain off. The driving transistors 2A and 3A perform on/off operation in synchronous rectification PWM driving. When the driving transistor 2A is off, and the driving transistor 3A is on, a current I1 as shown in FIG. 5A flows. On the other hand, when the driving transistor 2A is on, and the driving transistor 3A is off, a regenerative current I2 as shown in FIG. 5B flows due to the energy of the driving coils 1A and 1B. The mode of operation in which both the positive-side driving transistor 2A and the negative-side driving transistor 3A perform PWM driving in the aforementioned manner is synchronous rectification PWM driving.

A similar operation is performed during a period other than the period T1. Switching of the energization statuses of the driving coils 1A, 1B, and 1C causes generation of a rotational torque, which rotates the motor.

FIG. 6 shows the timing for the on/off control signals when the mode of driving switches. That is, the period covered in FIG. 6 includes a period which is a motor rotational speed decreasing period and when the power supply voltage Vcc raised by a backward current from the driving coils to the power supply is higher than the set value.

Between a time t1 and a time t2, the on/off control signals are output from the output PWM control section 4 so as to cause the driving transistors to perform one-way PWM driving. That is, when the driving transistors 3A, 3B, and 3C are performing on/off operation as PWM operation, the corresponding driving transistors 2A, 2B, and 2C are not performing PWM operation and are off.

Figure 7A:
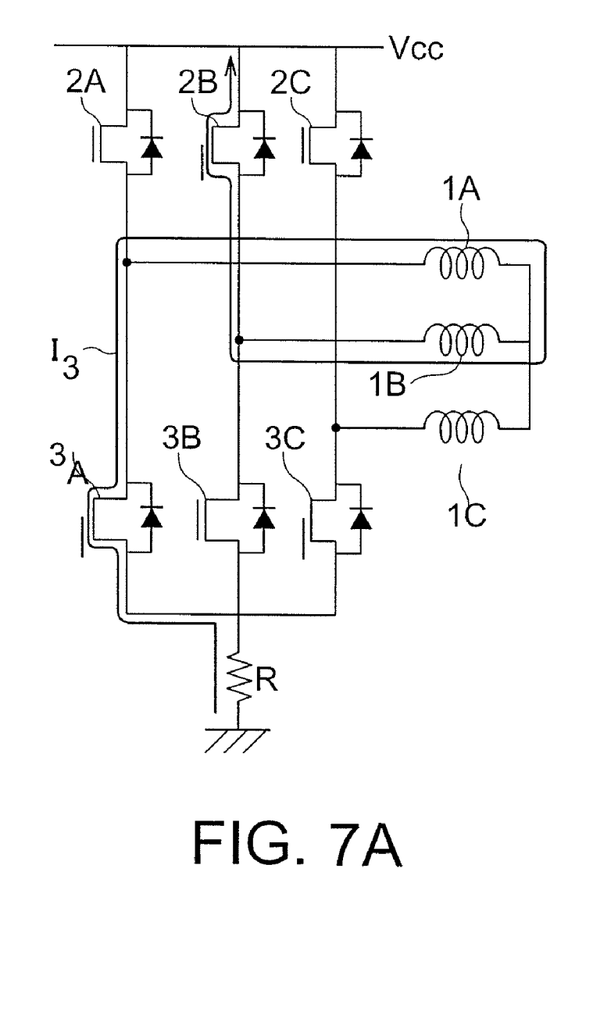
FIG. 7A is a diagram showing the flow of a regenerative current in the motor driving apparatus according to the embodiment.
Figure 7B:
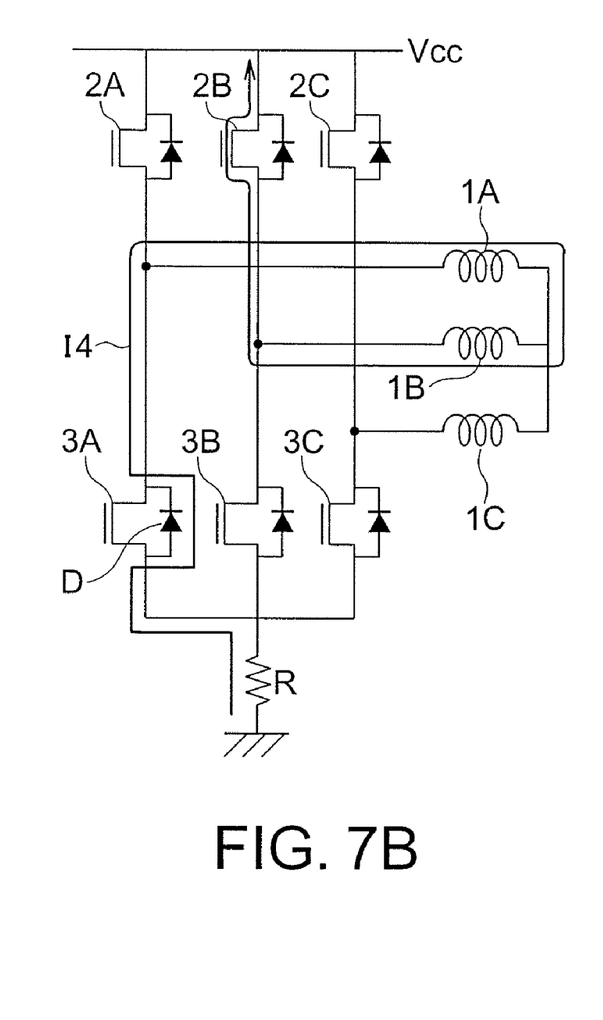
FIG. 7B is a diagram showing the flow of a regenerative current in the motor driving apparatus according to the embodiment.

For example, during a period T2, a current flows through the driving coil 1A and driving coil 1B in this order from the ground voltage due to a voltage induced by the motor. During the period T2, the driving transistor 2B remains on while the driving transistors 3B, 2C, and 3C remain off. The driving transistor 3A performs on/off operation as PWM operation while the driving transistor 2A remains off. Accordingly, when the driving transistor 3A is on, a current I3 as shown in FIG. 7A flows. On the other hand, when the driving transistor 3A is off, a regenerative current I4 as shown in FIG. 7B flows through the diode D formed between the source and drain of the driving transistor 3A. As described above, when the motor rotational speed is decreasing in one-way PWM driving, a current regeneratively flows backward to the power supply voltage Vcc regardless of whether the driving transistor in PWM operation is on or off. Accordingly, electricity is instantaneously discharged, and a rise in power supply voltage can be suppressed.

Figure 8:
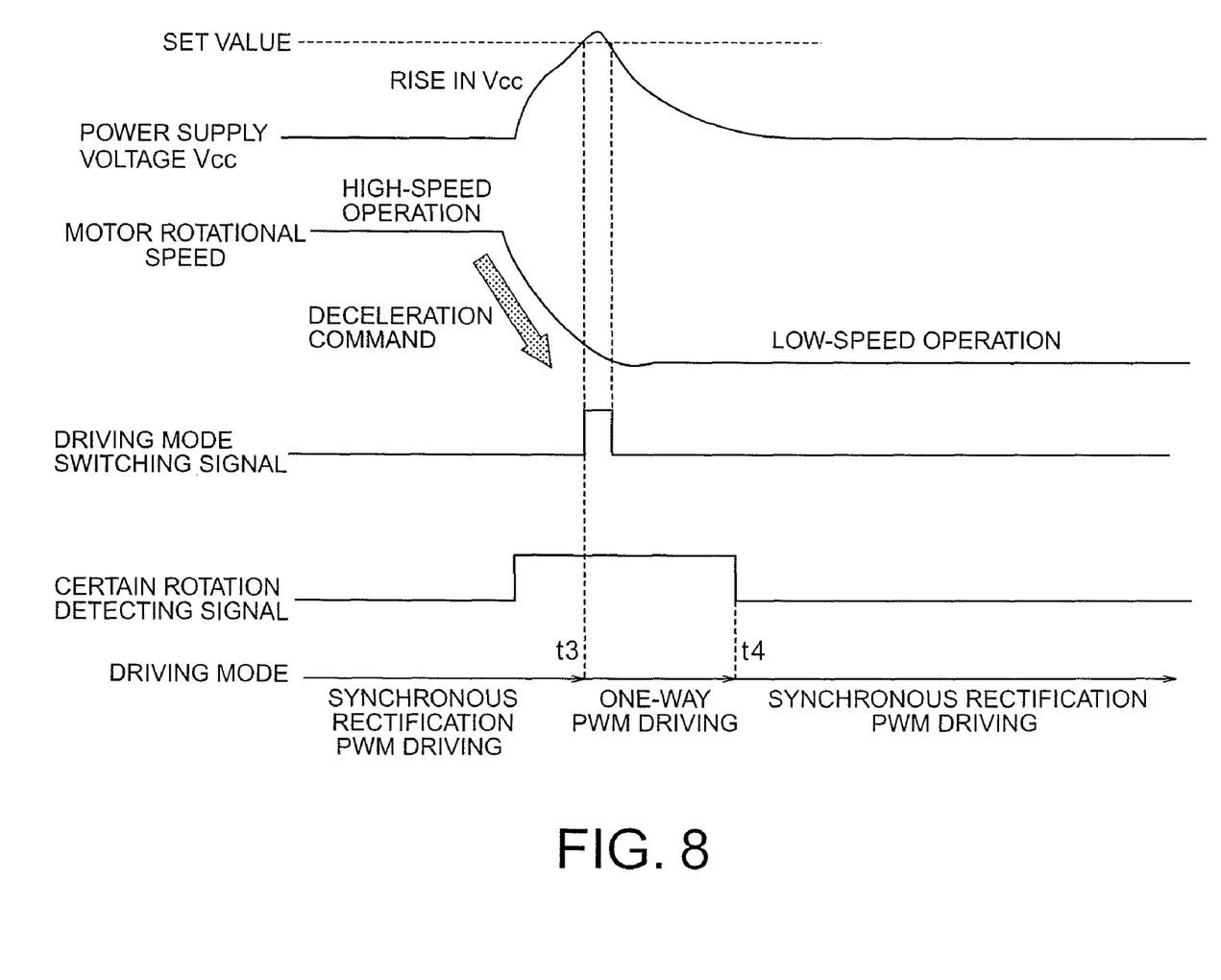
FIG. 8 is a chart showing driving mode switching in the motor driving apparatus according to the embodiment.

Note that when to return from one-way PWM driving to synchronous rectification PWM driving is based on the certain rotation detecting signal output from the speed deviation detecting circuit 9. Accordingly, as shown in FIG. 8, when the motor rotational speed decreases, and the power supply voltage Vcc rises to exceed the set value (t3), the mode of driving switches from synchronous rectification PWM driving to one-way PWM driving. When the motor rotational speed reaches the target speed region, and the certain rotation detecting signal changes to the low level (t4), the mode of driving returns to synchronous rectification PWM driving.

It is possible to prevent device breakdown by monitoring the power supply voltage Vcc and, if the power supply voltage Vcc exceeds the set value, switching the mode of driving from synchronous rectification PWM driving to one-way PWM driving. Setting of the set value to near the device rating makes it possible to prevent the mode of driving from switching from synchronous rectification PWM driving to one-way PWM driving every time the motor decreases speed, expand a scope covered by synchronous rectification PWM driving (increase the amount of time when synchronous rectification PWM driving is performed), and increase the motor driving efficiency.

As described above, the motor driving apparatus according to the aforementioned embodiment can prevent device breakdown caused by a rise in power supply voltage and efficiently drive the motor.

The on/off control signals for the positive-side driving transistors (2A to 2C) and those for the negative-side driving transistors (3A to 3C) in the embodiment shown in FIGS. 4 and 6 may be interchanged. In other words, the operation relationship between the positive-side driving transistors and the negative-side driving transistors may be reversed by interchanging the signals P2A and P3A, the signals P2B and P3B, and the signals P2C and P3C.

More specifically, during the period T1 shown in FIG. 4, the driving transistor 3B remains on, the driving transistors 2B, 2C, and 3C remain off, and the driving transistors 2A and 3A perform on/off operation in synchronous rectification PWM driving. When the driving transistor 2A is on, and the driving transistor 3A is off, a current flows through the driving transistor 2A, driving coil 1A, driving coil 1B, and driving transistor 3B in this order.

On the other hand, when the driving transistor 2A is off, and the driving transistor 3A is on, a current flows through the driving transistor 3A, driving coil 1A, driving coil 1B, and driving transistor 3B in this order.

During the period T2 shown in FIG. 6, the driving transistor 3B remains on, and the driving transistors 2B, 2C, and 3C remain off. The driving transistor 2A performs on/off operation as PWM operation, and the driving transistor 3A remains off.

When the driving transistor 2A is on, a current flows through the driving transistor 3B, driving coil 1B, driving coil 1A, and driving transistor 2A in this order. On the other hand, when the driving transistor 2A is off, a current flows through the driving transistor 3B, driving coil 1B, driving coil 1A, and the diode D formed between the source and drain of the driving transistor 2A in this order.

As described above, even if the operational relationship between the positive-side driving transistors and the negative-side driving transistors is made reverse to that in the embodiment, it is possible to prevent device breakdown caused by a rise in power supply voltage and efficiently drive the motor.

What is claimed is:

1. A motor driving apparatus comprising:
   a position detecting circuit which detects a positional relationship between a rotor magnet of a brushless motor and driving coils;
   an energization signal generating circuit which outputs an energization switching timing signal for the driving coils on the basis of a result of the detection by the position detecting circuit;
   a speed deviation detecting circuit which detects whether a rotational speed of the brushless motor falls within a speed region based on a target rotational speed obtained from a speed command signal and outputs a certain rotation detecting signal as a result of the detection and speed difference information indicating a difference between the rotational speed of the brushless motor and the target rotational speed based on the speed command signal;
   a rotational speed controlling circuit which outputs a speed controlling signal serving as an acceleration command or a deceleration command on the basis of the speed difference information;
   first, second, and third positive-side driving transistors having drains which are supplied with a power supply voltage and are commonly connected;
   first, second, and third negative-side driving transistors having sources which are grounded via a resistor and are commonly connected and the drains which are connected to sources of the first, second, and third positive-side driving transistors, respectively;
   a power supply monitoring circuit which monitors the power supply voltage and outputs a driving mode switching signal which has a first value if the power supply voltage is not less than a predetermined value and has a second value if the power supply voltage is less than the predetermined value; and
   an output PWM control section to which the energization switching timing signal, the certain rotation detecting signal, the speed controlling signal, and the driving mode switching signal are input and which is connected to gates of the positive-side driving transistors and negative-side driving transistors to perform on/off control and switches a mode of driving from synchronous rectification PWM driving to one-way PWM driving on the basis of a change of the driving mode switching signal from the second value to the first value, wherein
   the power supply monitoring circuit has:
      a regulator circuit which is supplied with the power supply voltage and outputs a first constant voltage;
      a first voltage dividing circuit which divides the first constant voltage and outputs a second constant voltage;
      a second voltage dividing circuit which divides the power supply voltage and outputs a voltage; and
      a comparator which is supplied with the second constant voltage and the voltage output from the second voltage dividing circuit and outputs a result of comparison as the driving mode switching signal.

2. The motor driving apparatus according to claim 1, wherein the output PWM control section switches the mode of driving from the one-way PWM driving to the synchronous rectification PWM driving on the basis of the certain rotation detecting signal.

3. The motor driving apparatus according to claim 1, wherein the voltage output from the second voltage dividing circuit is equal to the second constant voltage when the power supply voltage is the predetermined value.

4. The motor driving apparatus according to claim 1, wherein the first voltage dividing circuit has a plurality of resistors which are connected in series.

5. The motor driving apparatus according to claim 1, wherein the second voltage dividing circuit has a plurality of resistors which are connected in series.

6. The motor driving apparatus according to claim 1, wherein the speed deviation detecting circuit calculates a difference in a number of pulses corresponding to a difference between the rotational speed of the brushless motor and the target rotational speed using a pulse signal whose frequency is a predetermined number of times a frequency of a reference clock and outputs the difference in the number of pulses as the speed difference information.

7. The motor driving apparatus according to claim 6, wherein the rotational speed controlling circuit generates the speed controlling signal by converting the difference in the number of pulses into an analog signal.

8. A brushless motor comprising:
   a rotor magnet;
   first, second, and third driving coils which are provided to oppose the rotor magnet and have one ends commonly connected;
   a position detecting circuit which detects a positional relationship between the rotor magnet and the first, second, and third driving coils;
   an energization signal generating circuit which outputs an energization switching timing signal for the driving coils on the basis of a result of the detection by the position detecting circuit;
   a speed deviation detecting circuit which detects whether a rotational speed of the rotor magnet falls within a speed region based on a target rotational speed obtained from a speed command signal and outputs a certain rotation detecting signal as a result of the detection and speed difference information indicating a difference between the rotational speed of the rotor magnet and the target rotational speed based on the speed command signal;
   a rotational speed controlling circuit which outputs a speed controlling signal serving as an acceleration command or a deceleration command on the basis of the speed difference information;
   first, second, and third positive-side driving transistors having drains which are supplied with a power supply voltage and are commonly connected;
   first, second, and third negative-side driving transistors having sources which are grounded via a resistor and are commonly connected and the drains which are respectively connected to sources of the first, second, and third positive-side driving transistors and the other ends of the first, second, and third driving coils;

a power supply monitoring circuit which monitors the power supply voltage and outputs a driving mode switching signal which has a first value if the power supply voltage is not less than a predetermined value and has a second value if the power supply voltage is less than the predetermined value; and an output PWM control section to which the energization switching timing signal, the certain rotation detecting signal, the speed controlling signal, and the driving mode switching signal are input and which performs on/off control of the positive-side driving transistors and negative-side driving transistors and switches a mode of driving from synchronous rectification PWM driving to one-way PWM driving on the basis of a change of the driving mode switching signal from the second value to the first value, wherein the power supply monitoring circuit has:
a regulator circuit which is supplied with the power supply voltage and outputs a first constant voltage;
a first voltage dividing circuit which divides the first constant voltage and outputs a second constant voltage;
a second voltage dividing circuit which divides the power supply voltage and outputs a voltage; and
a comparator which is supplied with the second constant voltage and the voltage output from the second voltage dividing circuit and outputs a result of comparison as the driving mode switching signal.

9. The brushless motor according to claim 8, wherein the output PWM control section switches the mode of driving from the one-way PWM driving to the synchronous rectification PWM driving on the basis of the certain rotation detecting signal.

10. The brushless motor according to claim 8, wherein the voltage output from the second voltage dividing circuit is equal to the second constant voltage when the power supply voltage is the predetermined value.

11. The brushless motor according to claim 8, wherein the first voltage dividing circuit has a plurality of resistors which are connected in series.

12. The brushless motor according to claim 8, wherein the second voltage dividing circuit has a plurality of resistors which are connected in series.

13. The brushless motor according to claim 8, wherein the speed deviation detecting circuit calculates a difference in a number of pulses corresponding to a difference between the rotational speed of the rotor magnet and the target rotational speed using a pulse signal whose frequency is a predetermined number of times a frequency of a reference clock and outputs the difference in the number of pulses as the speed difference information.

14. The brushless motor according to claim 13, wherein the rotational speed controlling circuit generates the speed controlling signal by converting the difference in the number of pulses into an analog signal.

15. A method for driving a brushless motor using a motor driving apparatus having a position detecting circuit, an energization signal generating circuit, a speed deviation detecting circuit, a rotational speed controlling circuit, three positive-side driving transistors, three negative-side driving transistors, a power supply monitoring circuit, and an output PWM control section, wherein the position detecting circuit detects a positional relationship between a rotor magnet of the brushless motor and driving coils, the energization signal generating circuit outputs an energization switching timing signal for the driving coils on the basis of a result of the detection by the position detecting circuit, the speed deviation detecting circuit detects whether a rotational speed of the brushless motor falls within a speed region based on a target rotational speed obtained from a speed command signal and outputs a certain rotation detecting signal as a result of the detection and speed difference information indicating a difference between the rotational speed of the brushless motor and the target rotational speed based on the speed command signal, the rotational speed controlling circuit outputs a speed controlling signal serving as an acceleration command or a deceleration command on the basis of the speed difference information, the positive-side driving transistors and the negative-side driving transistors switch application of a power supply voltage to the driving coils, the power supply monitoring circuit monitors the power supply voltage and outputs a driving mode switching signal which has a first value if the power supply voltage is not less than a predetermined value and has a second value if the power supply voltage is less than the predetermined value, and the output PWM control section performs on/off control of the positive-side driving transistors and negative-side driving transistors on the basis of the energization switching timing signal, the certain rotation detecting signal, the speed controlling signal, and the driving mode switching signal and switches a mode of driving from synchronous rectification PWM driving to one-way PWM driving on the basis of a change of the driving mode switching signal from the second value to the first value, wherein the power supply monitoring circuit divides a first constant voltage which is generated using the power supply voltage and generates a second constant voltage, compares the second constant voltage with a voltage which is obtained by dividing the power supply voltage, and outputs a result of the comparison as the driving mode switching signal.

16. The brushless motor driving method according to claim 15, wherein the output PWM control section switches the on/off control from the one-way PWM driving to the synchronous rectification PWM driving on the basis of the certain rotation detecting signal.

17. The brushless motor driving method according to claim 15, wherein the speed deviation detecting circuit calculates a difference in a number of pulses corresponding to a difference between the rotational speed of the brushless motor and the target rotational speed using a pulse signal whose frequency is a predetermined number of times a frequency of a reference clock and outputs the difference in the number of pulses as the speed difference information.

* * * * *